US006806483B2

United States Patent
Iihama et al.

(10) Patent No.: US 6,806,483 B2
(45) Date of Patent: Oct. 19, 2004

(54) PHOTOSENSOR SYSTEM AND IMAGE READING METHOD

(75) Inventors: Tomomi Iihama, Fussa (JP); Hisashi Aoki, Hamura (JP); Makoto Sasaki, Hachioji (JP); Yasushi Mizutani, Hamura (JP); Yoshiaki Nakamura, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/202,681

(22) Filed: Jul. 24, 2002

(65) Prior Publication Data

US 2003/0020028 A1 Jan. 30, 2003

(30) Foreign Application Priority Data

Jul. 30, 2001 (JP) ........................................ 2001-228972

(51) Int. Cl.[7] .......................... G06K 11/00; G06K 5/00
(52) U.S. Cl. ..................... 250/556; 250/208.1; 382/124
(58) Field of Search ............................. 250/556, 208.1, 250/221; 348/302, 304, 307, 309, 294; 257/72, 443, E27.111, E27.133, E31.042, E31.085; 356/72, 71; 382/116, 126, 124

(56) References Cited

U.S. PATENT DOCUMENTS

| | | | | |
|---|---|---|---|---|
| 3,801,823 A | * | 4/1974 | Korn | 250/556 |
| 4,932,776 A | * | 6/1990 | Dowling et al. | 356/71 |
| 5,461,419 A | | 10/1995 | Yamada | |
| 5,583,570 A | | 12/1996 | Yamada | |
| 6,150,665 A | * | 11/2000 | Suga | 250/556 |
| 6,259,108 B1 | * | 7/2001 | Antonelli et al. | 250/556 |
| 6,399,938 B1 | * | 6/2002 | Sugawara et al. | 250/556 |
| 6,668,071 B1 | * | 12/2003 | Minkin et al. | 382/124 |
| 6,670,595 B1 | * | 12/2003 | Sasaki et al. | 250/208.1 |

* cited by examiner

Primary Examiner—Thanh X. Luu
Assistant Examiner—Seung C. Sohn
(74) Attorney, Agent, or Firm—Frishauf, Holtz, Goodman & Chick, P.C.

(57) ABSTRACT

A photosensor system includes a photosensor array which is constituted by two-dimensionally arraying a plurality of photosensors and has a light-receiving surface, and a front light source which is arranged to face the light-receiving surface at an interval, and illuminates a rear surface of an object whose front surface is set on the light-receiving surface. An image reading assembly reads an object image by receiving light that is emitted by the front light source and passes through the object.

19 Claims, 14 Drawing Sheets

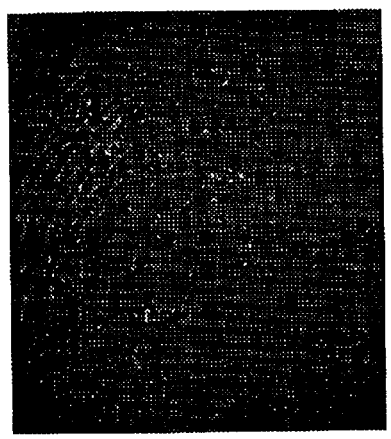  
FINGERPRINT IMAGE
BY BACK LIGHT METHOD
FINGERPRINT IMAGE
BY FRONT LIGHT METHOD
(FIRST EMBODIMENT)
FIG.3A
PRIOR ART
FIG.3B

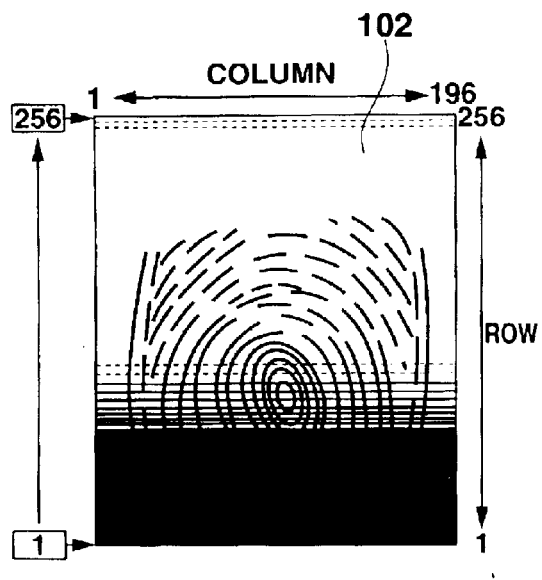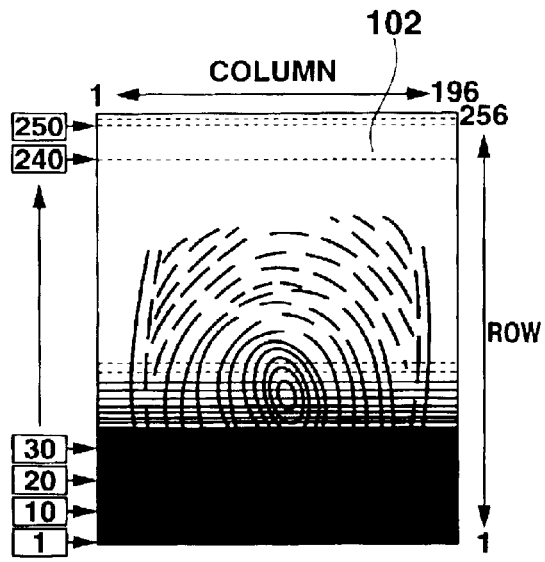
FIG.5A     FIG.5B
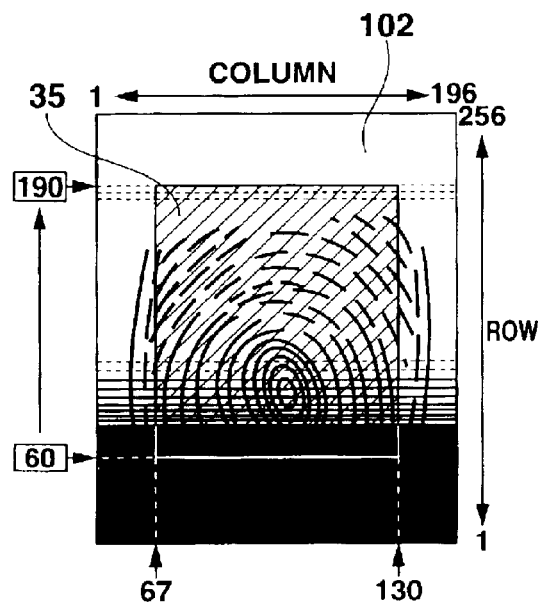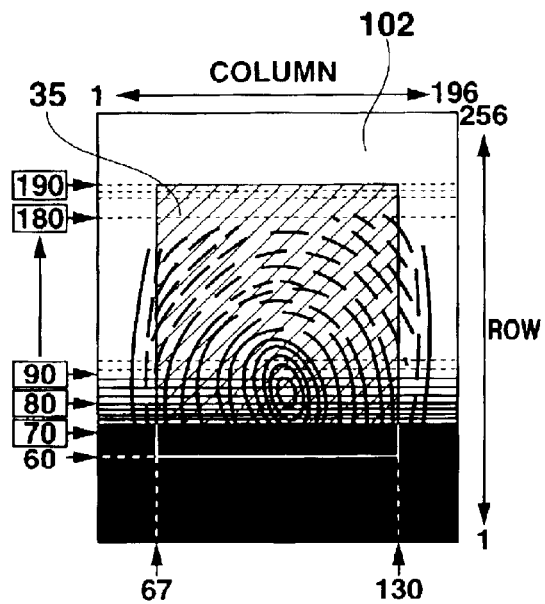
FIG.5C     FIG.5D

FIG.12A — FINGERPRINT IMAGE BY FRONT LIGHT METHOD (FIRST EMBODIMENT)

FIG.12B — FINGERPRINT IMAGE BY FRONT LIGHT + BACK LIGHT METHOD (THIRD EMBODIMENT)

PHOTOSENSOR SYSTEM AND IMAGE READING METHOD

CROSS-REFERENCE TO RELATED APPLICATIONS

This application is based upon and claims the benefit of priority from the prior Japanese Patent Application No. 2001-228972, filed Jul. 30, 2001, the entire contents of which are incorporated herein by reference.

BACKGROUND OF THE INVENTION

1. Field of the Invention

The present invention relates to a photosensor system having a photosensor array constituted by two-dimensionally arraying a plurality of photosensors, and an image reading method using the photosensor system.

2. Description of the Related Art

In recent years, individual identification techniques have actively been studied to strengthen the security function in access to a confidential document stored in a computer, e-commerce on a network, and entrance/exit to/from an important facility. The individual identification method uses, e.g., biometric information. In particular, fingerprints are different between individuals, do not change as long as a person lives, and thus are utilized as an important feature which realizes individual identification. From this, fingerprint collation apparatuses have enthusiastically been developed.

This fingerprint collation apparatus requires a two-dimensional image reading apparatus which uses a finger as an object to be sensed and reads a fine three-dimensional structure on the object surface. An example of the two-dimensional image reading apparatus is a photosensor system which comprises a photosensor array constituted by arraying photoelectric conversion elements (photosensors) in a two-dimensional matrix and reads a fingerprint image by the photosensor array. A known photosensor system of this type uses a transmission photosensor as a photoelectric conversion element and has an illumination light source attached to the back surface. A schematic arrangement of the photosensor system is shown in FIGS. 13, 14A, and 14B.

This photosensor system schematically comprises a photosensor array 101 and an illumination light source (back light) BL. In the photosensor array 101, a plurality of photosensors 10 are arrayed in a two-dimensional matrix on one surface of a glass board GB, and a light-receiving surface 102 is formed by covering the photosensor array with a transparent insulating film 20. The light source BL is arranged on the back side of the photosensor array 101 opposite to the side of the light-receiving surface 102. As the photosensor 10, e.g., a CCD is used. The photosensors 10 arrayed in a matrix are scanned and driven by horizontal and vertical scanning circuits (not shown). The number of electron-hole pairs (charge amount) generated in correspondence with the quantity of light incident on the light-receiving portions of the photosensors is detected to sense the luminance of received light.

To read a fingerprint image by the photosensor system, a finger is set on the light-receiving surface 102 and irradiated with light from the light source BL attached to the back surface of the photosensor array_-101. Light emitted by the light source BL irradiates the finger surface through transparent insulating film portions except the formation regions of the photosensors 10. The light is scattered and reflected in accordance with a three-dimensional structure corresponding to the fingerprint of the finger in contact with the light-receiving surface 102. Then, reflected light with a bright/dark pattern corresponding to the fingerprint enters the photosensor array 101.

When the finger touches the light-receiving surface 102, the ridge portions (projecting portions) of the fingerprint tightly contact the light-receiving surface 102, and strongly scatter and reflect irradiation light from the light source BL. A large quantity of light enters the photosensor 10, and the ridge portions are detected bright (white). The valley portions (recessed portions) of the fingerprint do not tightly contact the light-receiving surface 102, and irradiation light from the light source BL is weakly scattered at the interface between the transparent insulating film 20 and air. A small quantity of light enters the photosensor 10, and the valley portions are detected dark (black). The bright/dark pattern corresponding to three-dimensional structure of the fingerprint is two-dimensionally read to read the fingerprint image.

The state of the finger surface, i.e., the state of the skin surface of a person changes due to the individual difference in the secretion of sebum or the moisture retention of the skin. The skin surface state also varies depending on the ambient humidity, air temperature, or the like. The skin surface is finely corrugated, and even the surface of the ridge portion of the fingerprint is subtly corrugated.

FIG. 14A is an enlarged view showing the main part when the skin surface of the finger is moist with a proper amount of sebum or water at the fingerprint reading portion of the photosensor system. FIG. 14B is an enlarged view showing the main part when the skin surface of the finger is dry due to a shortage of sebum or water.

If the finger has a properly moistened skin, as shown in FIG. 14A, the ridge portions can tightly contact the light-receiving surface 102 via sebum, water, or the like. The entire ridge portions strongly scatter and reflect irradiation light, and the ridge and valley portions can be clearly read to accurately read the fingerprint image.

To the contrary, if the finger skin is dry, as shown in FIG. 14B, the skin surfaces at the ridge portions are finely corrugated, which make it difficult to tightly contact the light-receiving surface 102. The projecting portions of the ridge portions tightly contact the photosensor 10, strongly scatter and reflect irradiation light, and are detected bright (white). The recessed portions of the ridge portions do not tightly contact the light-receiving surface and are detected dark (black). In other words, even the ridge portion is detected bright (white) and dark (black) in different parts. As a result, the ridge portion becomes unclear, failing to accurately read the fingerprint image.

BRIEF SUMMARY OF THE INVENTION

The present invention has an advantage that a photosensor system which has a photosensor array constituted by two-dimensionally arraying a plurality of photosensors, uses the fingerprint of a finger as a finger to be sensed, and reads a fingerprint image can clearly read the fingerprint image of even a dry finger, and can read a fingerprint image with a uniform contrast without any contrast nonuniformity generated in the fingerprint image.

The present invention also has an advantage that the power consumption of an illumination light source used can be reduced in reading a fingerprint image.

To achieve the above advantages, a photosensor system according to the present invention comprises a photosensor array which is constituted by two-dimensionally arraying a plurality of photosensors and has a light-receiving surface, a first light source (front light) which is arranged to face the light-receiving surface, and illuminates a rear surface of a finger set on the light-receiving surface, and image reading section which reads a fingerprint image by receiving light that is emitted by the first light source and passes through the finger.

The image reading section in the present invention comprises sensitivity adjustment reading section which reads the fingerprint image at a plurality of image reading sensitivities, optimal image reading sensitivity deriving section which derives an optimal image reading sensitivity suitable for reading operation of the fingerprint image on the basis of fingerprint images read by the sensitivity adjustment reading section at the image reading sensitivities, and image reading sensitivity setting section which sets the optimal image reading sensitivity as an image reading sensitivity. The optimal image reading sensitivity deriving section extracts maximum and minimum values for each image reading sensitivity out of pixel data based on an image pattern of the read fingerprint image, calculates a data range, and derives the optimal image reading sensitivity on the basis of a_-change in the data range for each image reading sensitivity.

In the photosensor system of the present invention, the front light illuminates a finger from its back surface, and light having passed through the finger is received. This can reduce the influence of the contact state between the finger surface and the light-receiving surface of the photosensor array. Hence, the fingerprint image of even a dry finger can be clearly read.

The front light can be a white light source which provides an illuminance of at least 1,000 lux on the light-receiving surface. Since the wavelength of light having passed through the finger mainly falls within the red region, the front light can be a red light source which provides an illuminance of at least 100 lux on the light-receiving surface. In this case, the power consumption of the light source can be greatly reduced.

In order to obtain the above effects, the second photosensor system in the present invention comprises a second light source (back light) which illuminates via the photosensor array the front surface of the finger set on the light-receiving surface, in addition to the first photosensor system. The image reading section reads a fingerprint image by receiving light which is emitted by the first light source and passes through the finger, and light which is emitted by the second light source and reflected by the front surface of the finger.

The use of the back light can compensate for any non-uniformity of the contrast of the fingerprint image which may occur in the use of only the front light, thus obtaining a uniform-contrast fingerprint image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A and 3B are views showing a fingerprint image of a dry finger read by a conventional back light method, and a fingerprint image read by a front light method according to the first embodiment;

FIGS. 5A to 5D are conceptual views for explaining setting examples of the image reading sensitivity on a light-receiving surface when fingerprint image reading for sensitivity adjustment is performed;

DETAILED DESCRIPTION OF THE INVENTION

A photosensor system and image reading method according to the present invention will be described on the basis of preferred embodiments shown in the several views of the accompanying drawing.

(1) First Embodiment

Figure 1:
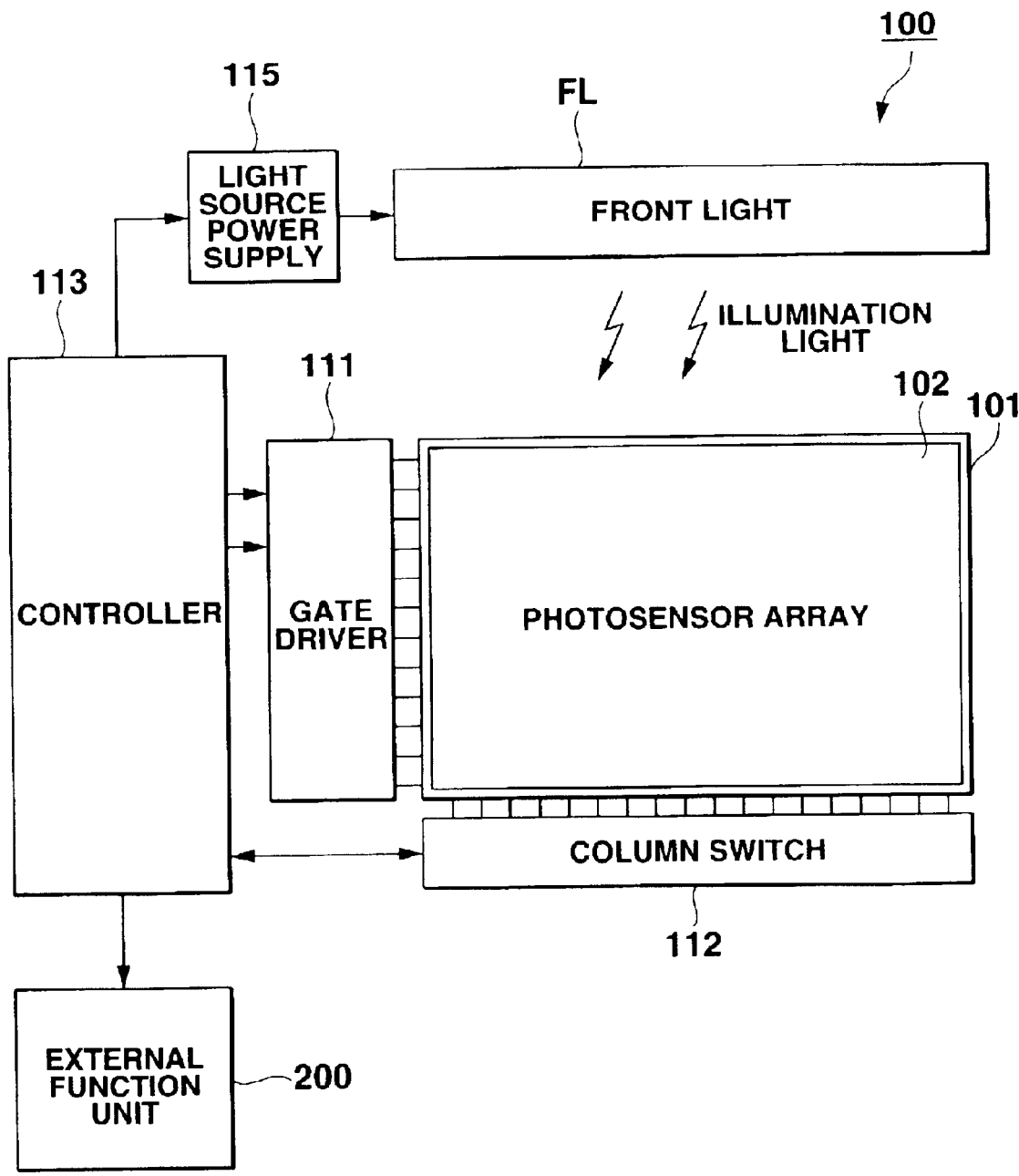
FIG. 1 is a block diagram showing an arrangement of a photosensor system according to the first embodiment of the present invention.

FIG. 1 is a block diagram showing an arrangement of a photosensor system according to the first embodiment of the present invention.

As shown in FIG. 1, a photosensor system 100 according to the first embodiment comprises a photosensor array 101, a gate driver 111, a column switch or an output circuit 112, a first light source (front light) FL, a light source power supply 115, and a controller 113. The photosensor array 101 has a light-receiving surface 102 constituted by two-dimensionally arraying a plurality of photosensors. The gate driver 111 supplies driving signals such as reset and read signals to the gate of each photosensor of the photosensor array 101. The column switch 112 supplies a precharge voltage to each photosensor, and reads out a detection voltage. The front light FL is arranged above the light-receiving surface 102 of the photosensor array 101 and emits illumination light. The light source power supply 115 controls the ON/OFF state of the front light FL. The controller 113 controls the gate driver 111, column switch 112, and front light FL to read an object image (fingerprint image), and controls the image reading sensitivity of the photosensor. The controller 113 has, e.g., an interface function of exchanging read fingerprint image information with an external function unit 200 having a computer which performs individual identification operation or the like.

The photosensor array 101 and front light FL constitute the following fingerprint reading portion.

The structure of the photosensor, the circuit arrangement of the photosensor system, the driving control method, and the like which can be preferably applied to this embodiment will be exemplified later.

Figure 2A:
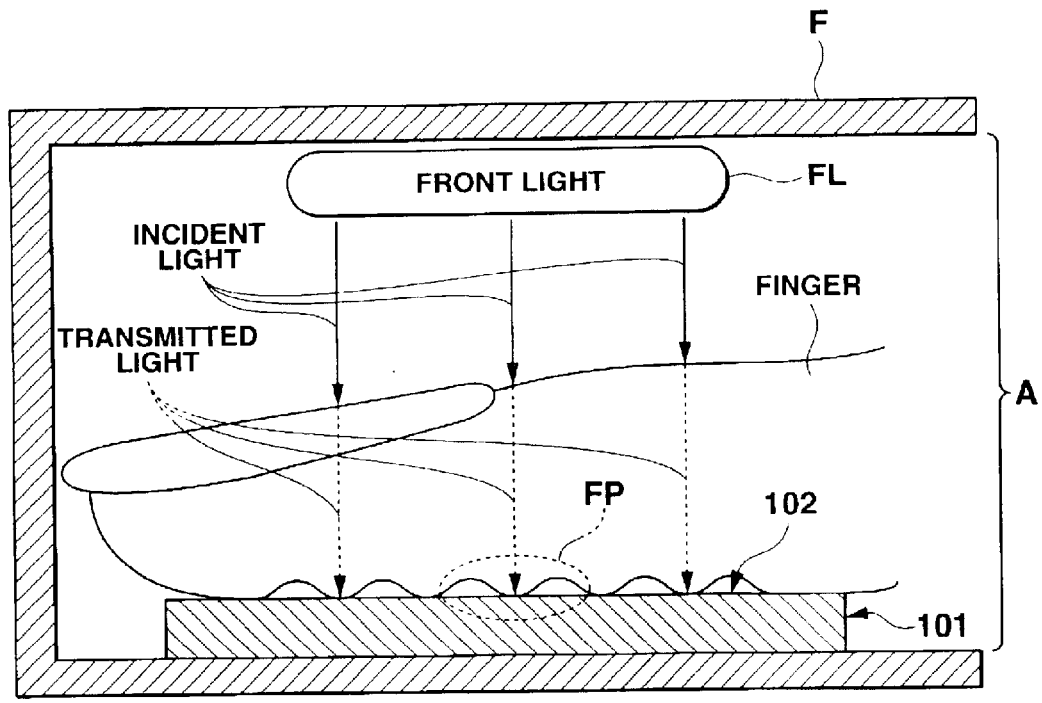
FIG. 2A is a sectional view showing the schematic structure of a fingerprint reading portion in the photosensor system according to the first embodiment.
Figure 2B:
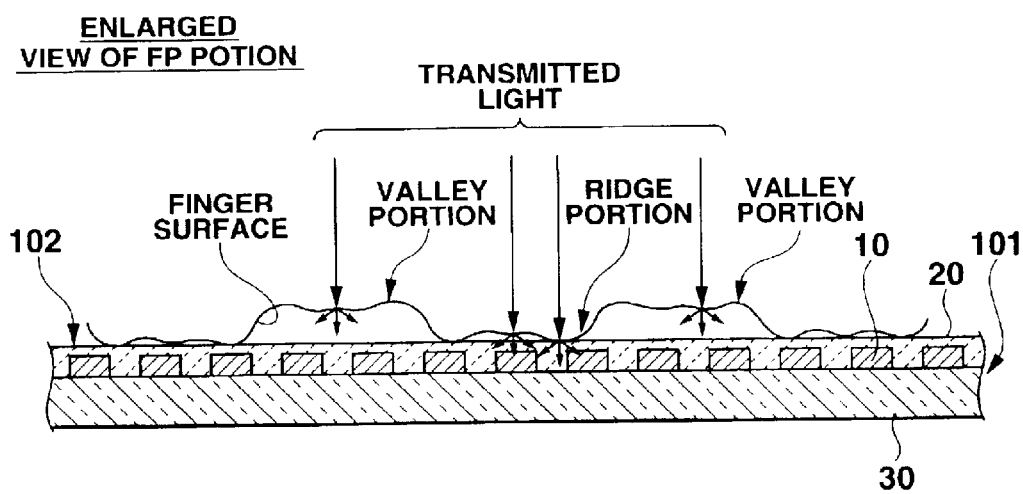
FIG. 2B is an enlarged sectional view showing the main part concerning fingerprint reading at the fingerprint reading portion in FIG. 2A.
Figure 14A:
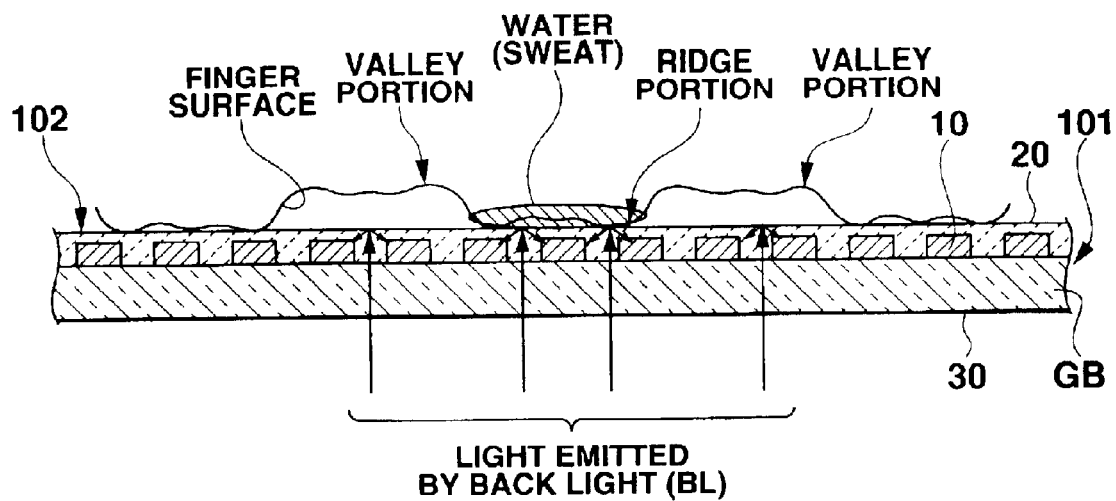
FIG. 14A is an enlarged sectional view showing the_-main part concerning fingerprint reading when the skin surface of the finger is moist with a proper amount of sebum or water at the fingerprint reading portion in FIG. 13.
Figure 14B:
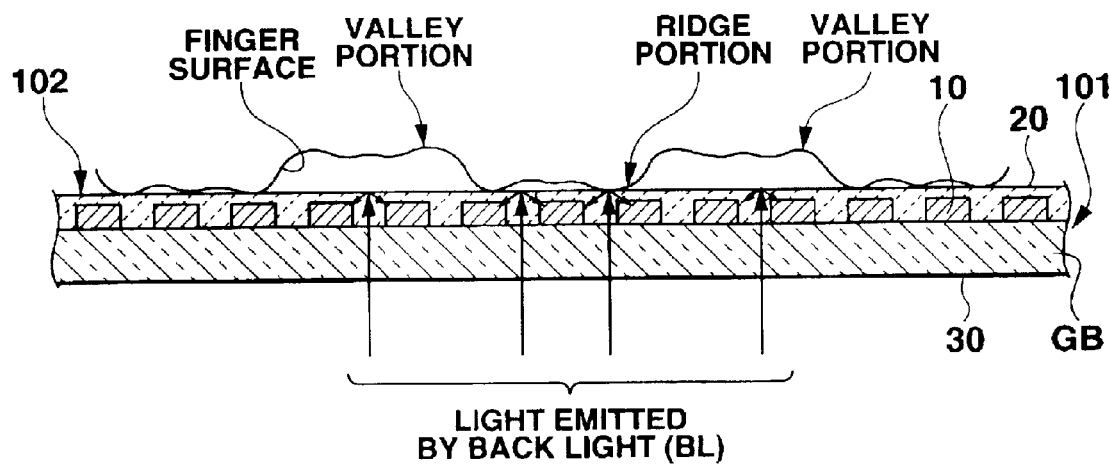
FIG. 14B is an enlarged sectional view showing the main part concerning fingerprint reading when the skin surface of the finger is dry at the fingerprint reading portion in FIG. 13.

FIG. 2A is a sectional view showing the schematic structure of a fingerprint reading portion in the photosensor system according to the first embodiment. FIG. 2B is an enlarged sectional view showing the main part concerning fingerprint reading at the fingerprint reading portion in FIG. 2A. In FIGS. 2A and 2B, the _-same reference numerals as in the prior art shown in FIGS. 14A and 14B denote the same parts, and a _-detailed description thereof will be omitted.

The fingerprint reading portion of the first embodiment shown in FIG. 2A comprises the photosensor array 101, the front light FL, and a housing F. The front light FL is arranged at a position where the front light FL faces the light-receiving surface 102 of the photosensor array 101. The front light FL irradiates the rear surface of a finger set on the light-receiving surface 102. The housing F supports the front light FL, covers the photosensor array 101, and has an opening A to which a finger is inserted. The housing F has a laterally U-shaped section. This embodiment utilizes the characteristic of a human finger which transmits illumination light to a certain degree. The light source is arranged on the rear side of the finger to irradiate the finger, and light having passed through the finger is detected by the photosensor array 101 to read the fingerprint image.

The housing F has a U-shaped section in FIG. 2A, but is not limited to this as far as the finger can be inserted and is not irradiated with ambient light other than light from the front light FL as much as possible. When ambient light is almost constant in, e.g., a room, the housing F need not shield external light and simply supports the front light FL.

As the front light FL, this embodiment adopts a light source which emits light at an illuminance enough to detect light having passed through the finger by the photosensor 10. When the photosensor 10 is a double-gate photosensor (to be described later), the front light FL may be a halogen lamp which provides an illuminance of 1,000 lux on the light-receiving surface 102 bearing no finger. The front light FL is not limited to the halogen lamp, and may be a front light FL having a wavelength distribution corresponding to the wavelength sensitivity characteristic of the photosensor 10. For example, when the photosensor 10 has a high light-receiving sensitivity in the visible light region, a white LED may be used as the front light FL. In this case, the power consumption of the front light FL may be reduced.

In this arrangement, as shown in FIG. 2B, light which is emitted by the front light FL and passes through the finger scatters in emerging from the skin surface of the finger. At the ridge portions of the fingerprint, the interval from the photosensor 10 is small, and most of the scattering light emerging from the ridge portions enters the photosensor 10. The quantity of light received by the photosensor 10 is large, and the ridge portions are detected bright (white). On the other hand, at the valley portions of the fingerprint, the interval from the photosensor 10 is relatively large, and light emerging from the skin surface is widely scattered. The light hardly enters the photosensor 10, the quantity of light received by the photosensor 10 is small, and the valley portions are detected dark (black). In this case, the quantity of light incident on the photosensor 10 changes depending on the recessed/projecting shape on the skin surface of the finger irrespective of the degree of contact between the finger surface and the light-receiving surface 102. Even if, therefore, the ridge portions do not satisfactorily tightly contact the light-receiving surface 102 owing to fine corrugations on the skin surface, as shown at the center of FIG. 2B, the quantity of light incident on the photosensor 10 hardly changes, and the ridge portions are detected uniformly bright (white).

That is, when the skin surface of the finger is dry and thus it is difficult for the skin to tightly contact the light-receiving surface 102 of the photosensor array 101, the contact state between the light-receiving surface 102 and the skin surface of the finger greatly would influence a fingerprint image in the conventional method using the back light, as described above. As a result, the conventional method cannot obtain a clear fingerprint image. However, in the use of the front light FL according to the first embodiment, the degree of scattering of light which passes through the finger and enters the photosensor 10 changes between the ridge and valley portions of the finger. Utilizing this fact can reduce the influence of the contact state between the light-receiving surface 102 and the skin surface. Hence, the photosensor system of this embodiment can clearly read a fingerprint image formed from a bright/dark pattern corresponding to the projecting/recessed pattern of the fingerprint.

FIGS. 3A and 3B show a comparison between a fingerprint image read by the conventional back light method and a fingerprint image read by the front light method according to the first embodiment both of a dry finger. In the conventional back light method shown in FIG. 3A, the fingerprint image obtained by reading the dry finger is unclear. The fingerprint image in FIG. 3B by the first embodiment exhibits a clear fingerprint image of the dry finger.

Figure 4:
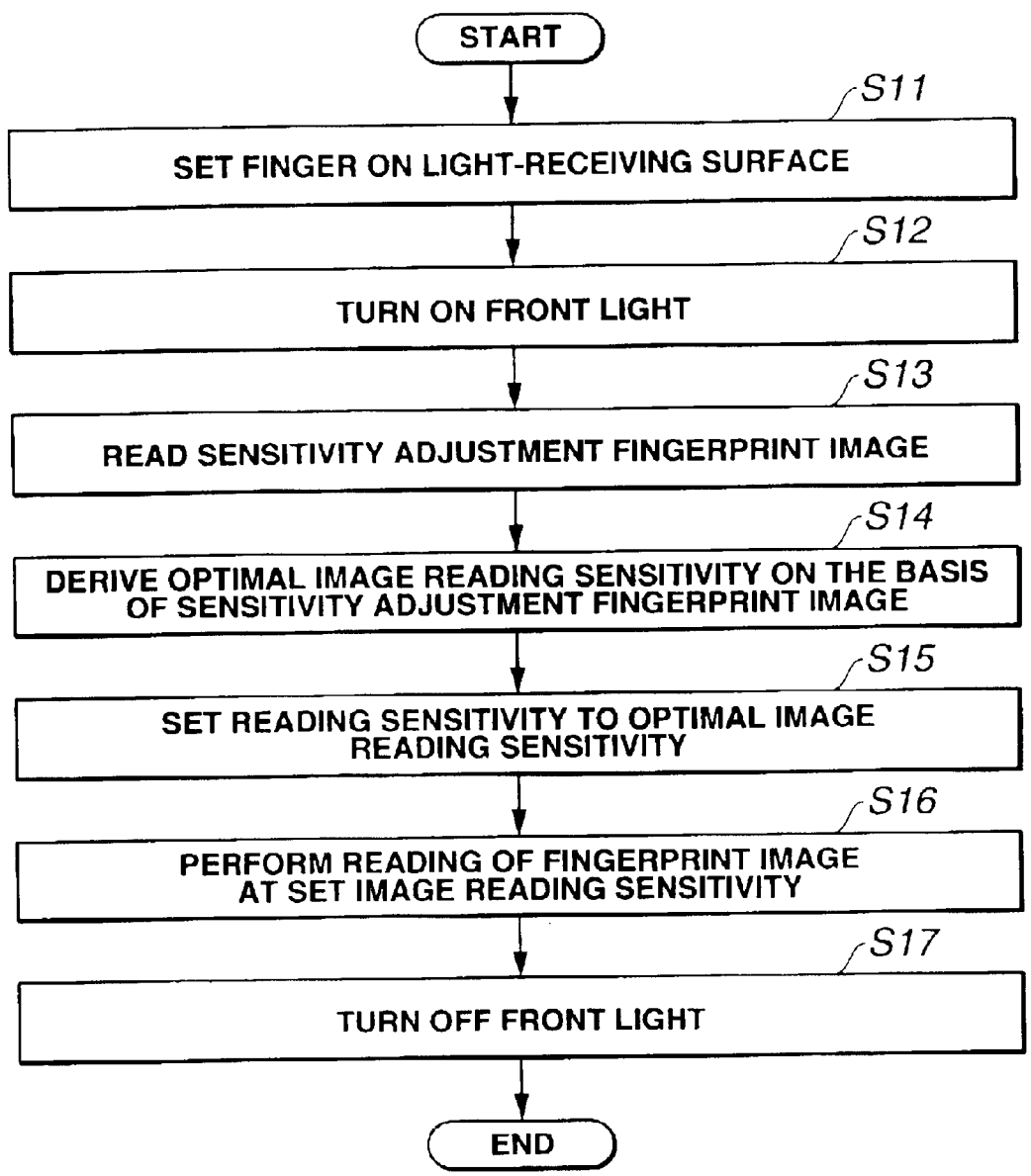
FIG. 4 is a flow chart showing the schematic operation of the photosensor system according to the first embodiment.

FIG. 4 is a flow chart showing the schematic operation of the photosensor system. The operation will be explained by properly referring to the arrangement of the photosensor system 100 shown in FIG. 1.

In the operation of the photosensor system, as shown in FIG. 4, a finger is set on the light-receiving surface of the photosensor array 101 (step S11).

Then, the front light FL is turned on (step S12). The front light FL may be kept on, but is preferably turned on every time it is to be used in order to reduce the power consumption.

A fingerprint image is read while the reading sensitivity is changed in a plurality of steps (step S13). Fingerprint image reading for sensitivity adjustment is performed, and an image reading sensitivity which provides the highest-quality image is derived from the fingerprint image read by fingerprint image reading for sensitivity adjustment (step S14).

The thickness of a human finger, the color of the skin, or the like is different between individuals, and ambient light may enter the system. These factors change the quantity of light passing through the finger in the use of the front light. Furthermore, the sensitivity characteristic of the photosensor 10 may change over time. Such a change influences a read fingerprint image, and the reading sensitivity must be always set to an optimal value with respect to the quantity of light incident on the photosensor 10 in order to obtain a high-quality fingerprint image. Sensitivity adjustment operation in steps S13 and S14 is done to set an optimal reading sensitivity. Sensitivity adjustment operation copes with a change in use environment or photosensor characteristic, as described above. This operation need not be executed every time the front light is used, and may be performed only when, e.g., the use environment changes or the collation of the fingerprint image fails.

The image reading sensitivity set in step S13 in each photosensor 10 which constitutes the photosensor array 101 may be changed stepwise every row in the entire region of the light-receiving surface 102 or in a detection region defined in part of the region of the light-receiving surface 102. Alternatively, the image reading sensitivity may be changed stepwise every predetermined number of rows. Alternatively, only a predetermined one or a plurality of rows may be used. Alternatively, the image reading sensitivity may be changed in the entire region of the light-receiving surface 102 or every detection region 35.

More specifically, when the light-receiving surface 102 is made up of for example 256×196 pixels (photosensors), a fingerprint may be read while the image reading sensitivity is sequentially changed on all of the 256 rows, as shown in FIG. 5A. Alternatively, a fingerprint may be read while the image reading sensitivity is sequentially changed at an interval of a plurality of rows (in this case, an interval of 10 rows) or every plurality of rows (e.g., 10 rows) such as the 10th row, 20th row, . . . , 180th row, and 190th row, as shown in FIG. 5B. Alternatively, a fingerprint may be read while the image reading sensitivity is sequentially changed on all of the rows of the detection region 35 defined by a row range of 60th to 190th rows and a column range of 67th to 130th columns, as shown in FIG. 5C. Alternatively, a fingerprint may be read while the image reading sensitivity is sequentially changed at an interval of a plurality of rows (in this case, an interval of 10 rows) or every plurality of rows (e.g., 10 rows) such as the 70th row, 80th row, . . . , 180th row, and 190th row within the detection region 35, as shown in FIG. 5D.

In step S14, an optimal image reading sensitivity is derived by extracting an image reading sensitivity which maximizes a data range (dynamic range) serving as the difference between the maximum and minimum values of pixel data formed from, e.g., lightness data based on the image pattern of a fingerprint image at each image reading sensitivity. However, derivation of an optimal image reading sensitivity is not limited to this. For example, an image reading sensitivity which maximizes the dynamic range may be extracted using data prepared by removing data having an abnormal value from pixel data of a read fingerprint image. It is also possible to extract an image reading sensitivity which maximizes the dynamic range from pixel data of a read fingerprint image, perform appropriate correction for the extracted image reading sensitivity, and calculate an optimal image reading sensitivity.

After that, the reading sensitivity is set to the extracted optimal sensitivity (step S15).

Normal fingerprint image reading is done at the set image reading sensitivity (step S16).

After normal fingerprint image reading ends, the front light FL is turned off in a case in which the front light FL is not kept on (step S17).

By these procedures, fingerprint image reading at the optimal image reading sensitivity is executed.

In the first embodiment, the image reading sensitivity of the photosensor 10 is adjusted to an optimal value in order to accurately read a fingerprint image. Instead, it is also possible to keep the image reading sensitivity of the photosensor 10 constant, control the illuminance of the front light FL by the light source power supply 115 so as to attain an optimal fingerprint image, and set the illuminance to an optimal value. In this case, for example, the image reading sensitivity is kept constant. While the illuminance of the front light FL is changed in a plurality of steps, a fingerprint image is read. An optimal illuminance of the front light FL is obtained and set on the basis of read fingerprint images at respective illuminances. Alternatively, the illuminance of the front light FL may be controlled such that transmitted light which changes depending on the thickness of the finger or the color of the skin is maintained at a predetermined quantity of light on the light-receiving surface 102. According to these methods, a fingerprint image formed from a bright/dark pattern corresponding to the projecting/recessed pattern of the fingerprint can be clearly read. Brightness nonuniformity in the fingerprint image caused by a change in the quantity of transmitted light can be avoided.

The arrangement of the photosensor applied to this embodiment is not particularly limited, and various photosensors such as a CCD and CMOS sensor may be applied. As is well known, a typical CCD is constituted by arraying photosensors such as photodiodes or thin-film transistors in a matrix on a silicon substrate. The number of electron-hole pairs (charge amount) generated in correspondence with the quantity of light incident on the light-receiving portions of the photosensors is detected by horizontal and vertical scanning circuits to sense the luminance of irradiation light. In a photosensor system using the CCD, selector transistors which select photosensors must be individually arranged for the photosensors. As the number of pixels increases, the photosensor system becomes more bulky. As a photosensor which can downsize the photosensor system, can be formed on a glass substrate at low cost, and can be preferably applied to fingerprint image reading, a photosensor using a thin-film transistor with a so-called double-gate structure (to be referred to as a double-gate photosensor hereinafter) having photosensing and selection functions is developed. The structure of the double-gate photosensor and a photosensor system using the double-gate photosensor will be explained.

Figure 6A:
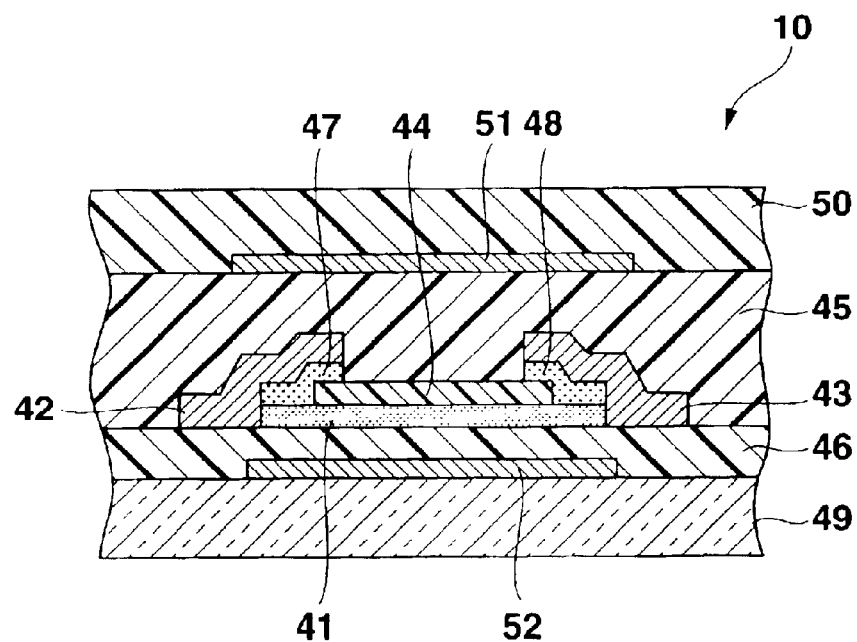
FIG. 6A is a sectional view showing the structure of a double-gate photosensor applied to the photosensor system of the present invention.
Figure 6B:
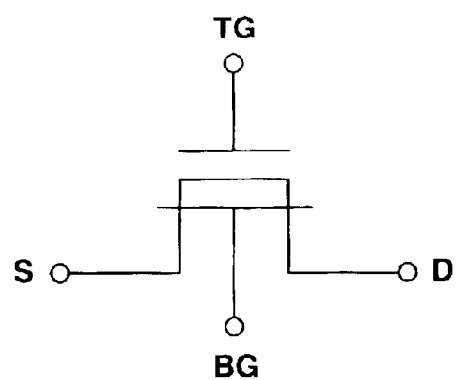
FIG. 6B is an equivalent circuit diagram showing the double-gate photosensor.

FIG. 6A is a sectional view showing the structure of the double-gate photosensor 10. FIG. 6B shows an equivalent circuit of the double-gate photosensor 10.

The double-gate photosensor 10 comprises a semiconductor thin film 41, $n^+$-type silicon layers 47 and 48, a source electrode 42, a drain electrode 43, a top gate electrode 51, a protective insulating film 50, and a bottom gate electrode 52. The semiconductor thin film 41 is made of amorphous silicon or the like. The $n^+$-type silicon layers 47 and 48 are respectively formed at the two ends of the semiconductor thin film 41. The source electrode 42 and drain electrode 43 are respectively formed on the n+-type silicon layers 47 and 48. The top gate electrode 51 is formed above the semiconductor thin film 41 via a block insulating film 44 and upper gate insulating film 45. The protective insulating film 50 is formed on the top gate electrode 51 and insulating film 45. The bottom gate electrode 52 is formed below the semiconductor thin film 41 via a lower gate insulating film 46. This structure is formed on a transparent insulating substrate 49 such as a glass substrate.

The double-gate photosensor 10 is equivalently constructed by an upper MOS transistor made up of the semiconductor thin film 41, source electrode 42, drain electrode 43, and top gate electrode 51, and a lower MOS transistor made up of the semiconductor thin film 41, source electrode 42, drain electrode 43, and bottom gate electrode 52. As shown in the equivalent circuit of FIG. 6B, the double-gate photosensor 10 can be considered as a combination of two MOS transistors which share the semiconductor thin film 41 as a common channel region and have a TG (Top Gate terminal), BG (Bottom Gate terminal), S (Source terminal), and D (Drain terminal).

The protective insulating film 50, top gate electrode 51, upper gate insulating film 45, block insulating film 44, and lower gate insulating film 46 are made of high-transmittance materials with respect to visible light which excites the semiconductor layer 41. Light coming from the top gate electrode 51 side passes through the top gate electrode 51, upper gate insulating film 45, and block insulating film 44, and enters the semiconductor thin film 41. Then, charges (holes) are generated and accumulated in the_-channel region.

Figure 7:
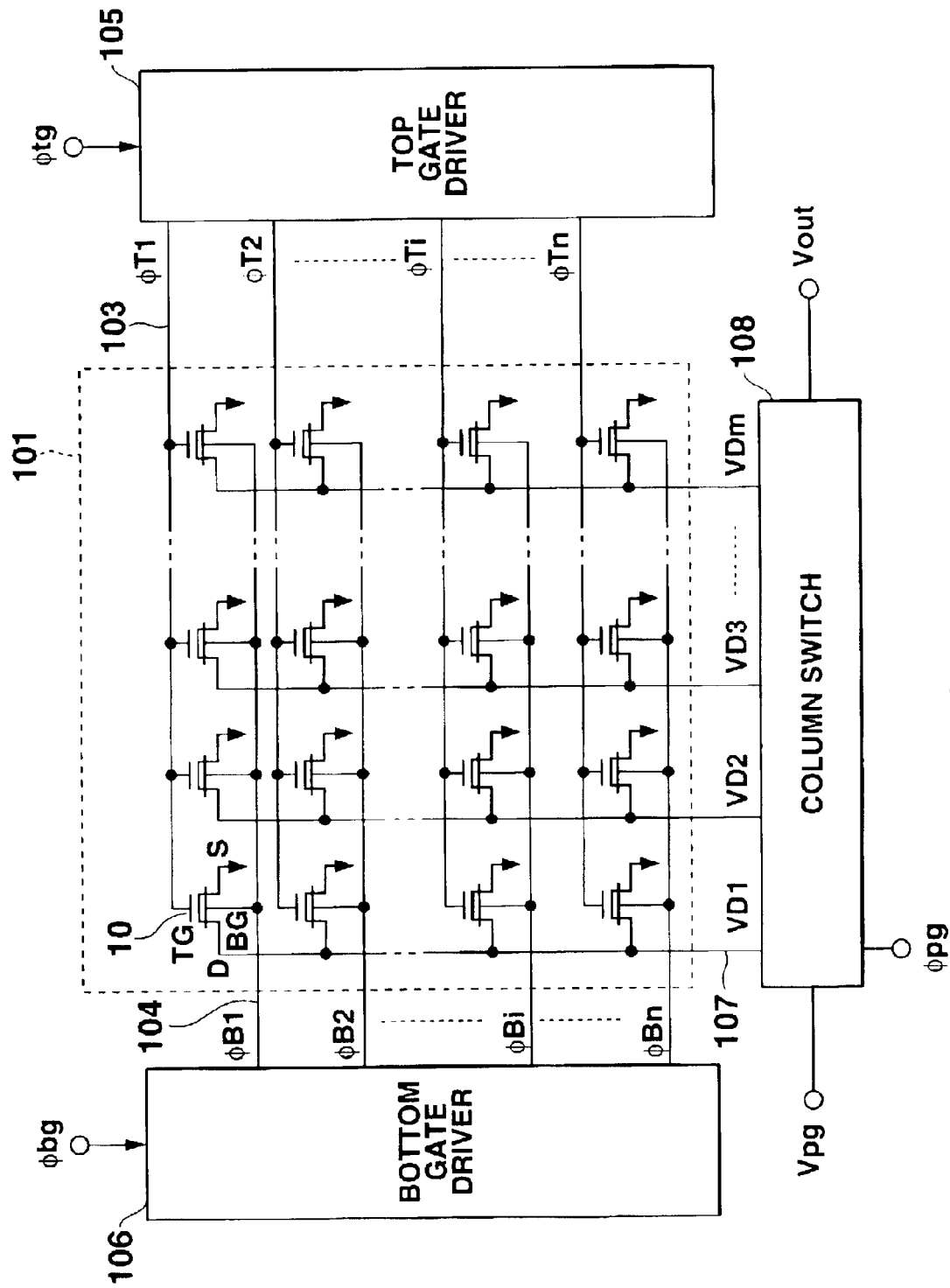
FIG. 7 is a diagram showing the arrangement of a photosensor array constituted by two-dimensionally arraying double-gate photosensors, and the arrangement of a driving circuit.

FIG. 7 shows the arrangement of a photosensor array constituted by two-dimensionally arraying the double-gate photosensors 10, and the arrangement of a driving circuit. As shown in FIG. 7, the photosensor array 101 is constituted by a plurality of double-gate photosensors 10, top gate lines 103, bottom gate lines 104, and data lines 107. The double-gate photosensors 10 are arrayed in an n×m matrix. The top gate lines 103 and bottom gate lines 104 connect the top gate terminals TG and bottom gate terminals BG of the double-gate photosensors 10 in the row direction. The data lines 107 connect the drain terminals D of the double-gate photosensors 10 in the column direction. The driving circuit which drives the photosensor array 101 comprises a top gate driver 105 and bottom gate driver 106 respectively connected to the top gate lines 103 and bottom gate lines 104, and a column switch 108 connected to the data lines 107.

Reference symbols φtg and φbg denote control signals for generating a reset pulse φTi and read pulse φBi (to be described later); and φpg, a precharge pulse which controls the application timing of a precharge voltage Vpg.

In this arrangement, the photosensing function is realized by applying a predetermined voltage from the top gate driver 105 to the top gate terminal TG, which will be described later. The reading function is realized by applying a predetermined voltage from the bottom gate driver 106 to the bottom gate terminal BG, outputting the output voltage of the photosensor 10 to the column switch 108 via the data line 107, and outputting the received voltage as serial data Vout. The top gate driver 105 and bottom gate driver 106 correspond to the gate driver 111 in the photosensor system 100 of FIG. 1, whereas the column switch 108 corresponds to the output circuit 112.

Figure 8:
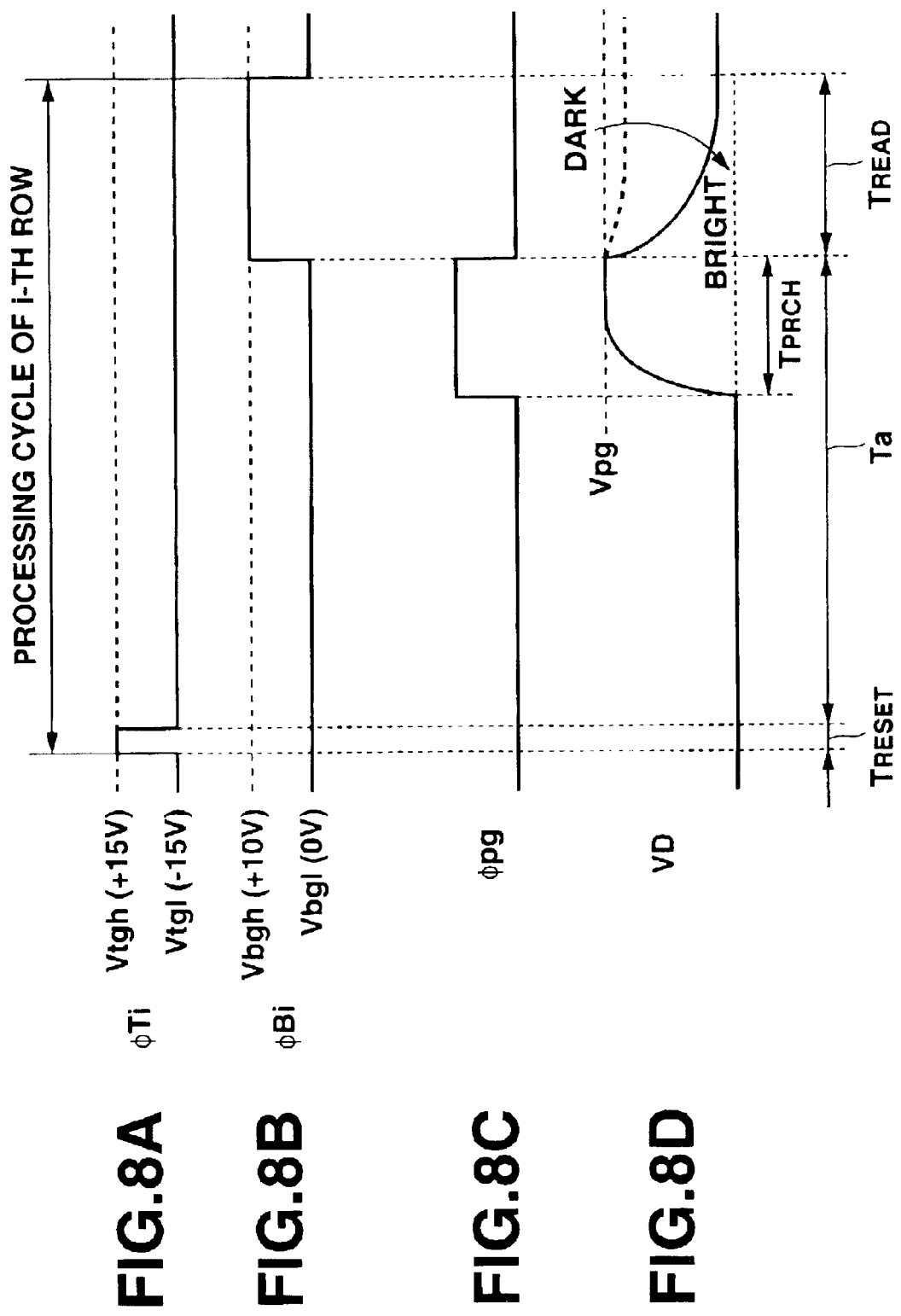
FIGS. 8A to 8D are timing charts showing the driving control method of the double-gate photosensor system.

FIGS. 8A to 8D are timing charts showing the driving control method of the photosensor system. FIGS. 8A and 8D show a detection operation period (processing cycle of the ith row) on the ith row of the photosensor array 101. First, a high-level pulse voltage (reset pulse; e.g., Vtg=+15 V) φTi shown in FIG. 8A is applied to the top gate line 103 on the ith row. This leads to reset operation of removing charges accumulated in the double-gate photosensors 10 on the ith row during a reset period $T_{reset}$. Then, a low-level (e.g., Vtg=−15 V) bias voltage φTi is applied to end the reset period $T_{reset}$. A charge accumulation period Ta by charge accumulation operation to the channel region starts. In the charge accumulation period Ta, charges (holes) are accumulated in the channel region in accordance with the quantity of light coming from the top gate electrode side.

In the charge accumulation period Ta, the precharge pulse φpg shown in FIG. 8C with the precharge voltage Vpg is applied to the data line 107. After a precharge period $T_{prch}$ during which charges are_-held in the drain electrode 43, a high-level (e.g., −Vbg =+10 V) bias voltage (read pulse φBi) shown in FIG. 8B is applied to the bottom gate line_-104. Then, the double-gate photosensor 10 is turned on, and a read period $T_{read}$ starts.

In the read period $T_{read}$, charges accumulated in the channel region act to relax a low-level voltage (e.g., Vtg=−15 V) applied to the top gate terminal TG having the opposite polarity. The voltage Vbg of the bottom gate terminal BG forms an n-channel, and voltage VD of the data line 107 tends to gradually decrease from the precharge voltage Vpg in accordance with the drain current upon the lapse of time. That is, the change trend of the voltage VD of the data line 107 depends on the charge accumulation period Ta and the quantity of received light. As shown in FIG. 8D, the voltage VD decreases gradually when the quantity of incident light is small and the fingerprint image is dark, and steeply when the quantity of incident light is large and the fingerprint image is bright. Hence, the quantity of irradiation light is converted by detecting the voltage VD of the data line 107 upon the lapse of a predetermined time in the read period $T_{read}$ or detecting a time until the voltage reaches a predetermined threshold voltage. This driving control is sequentially performed for each row of the photosensor array 101. Alternatively, respective rows are driven and controlled parallel to each other at timings at which the driving pulses do not overlap each other. As a result, a two-dimensional image is read.

(2) Second Embodiment

Figure 9:
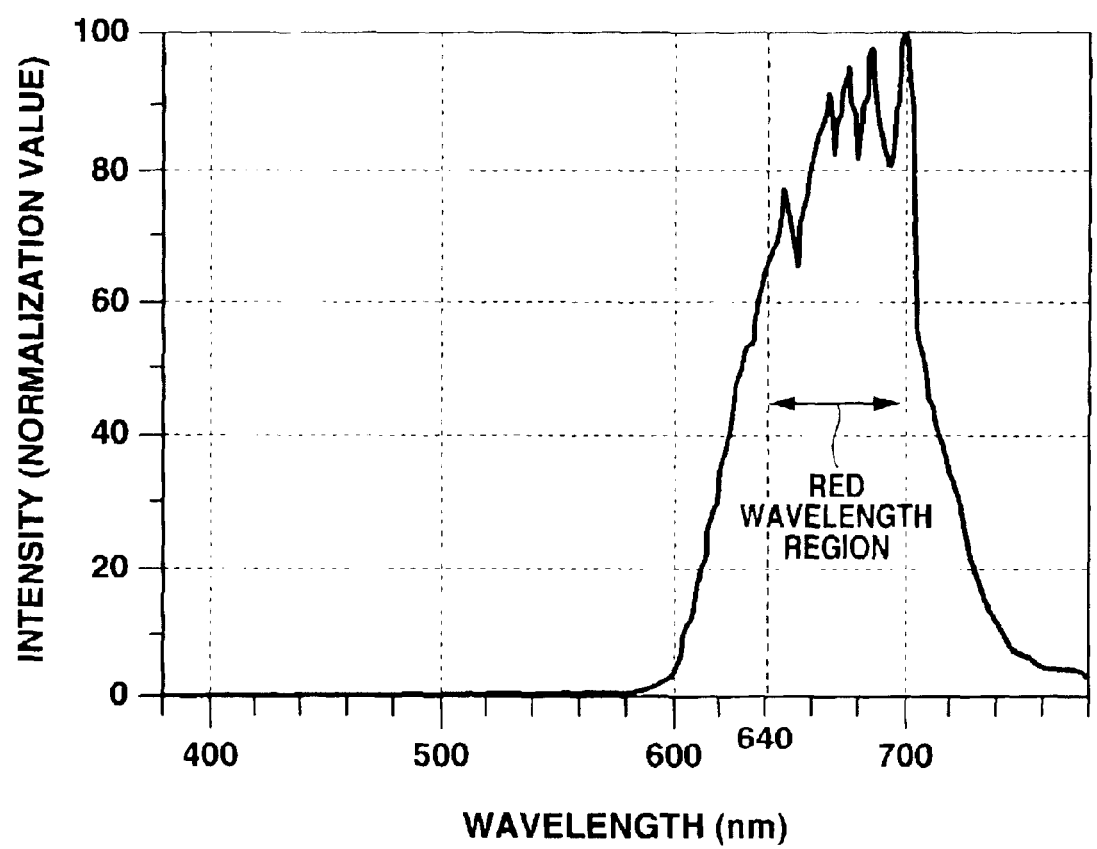
FIG. 9 is a graph showing the wavelength distribution as a function of the intensity (normalization value) of light having passed through the finger when a halogen lamp is used as a front light.

In the first embodiment, the front light FL is a halogen lamp as a white light source. FIG. 9 shows an example of the results of measuring the wavelength distribution as a function of the intensity (normalized using 100 as a maximum value) of light having passed through the finger when the halogen lamp is used as the front light FL.

As is well known, light emitted by the halogen lamp has a wide wavelength distribution of 400 nm to 750 nm. As shown in FIG. 9, of light after transmission through the finger, light within a wavelength region of 600 nm to 750 nm, and especially light within a red wavelength region of 640 nm to 700 nm passes through the finger. Light in the remaining wavelength region hardly passes through the finger. In other words, even if light emitted by the front light FL is white light, the wavelength component of light which actually passes through the finger and enters the photosensor is substantially a component in the red wavelength region. The remaining wavelength components do not pass through the finger and are wasteful. From this, a light source which emits only red light may be used as the front light FL used. In this case, light emitted by the light source can be more efficiently exploited.

In this case, a light source lower in illuminance than the white light source can be adopted. More specifically, a red LED (Light-Emitting Diode) which provides an illuminance of at least 100 lux on the light-receiving surface 102 bearing no finger on it can be employed. The use of the red LED as the front light FL can reduce the illuminance to about 1/10 that in the use of white light. As a result, the power consumption of the light source can be greatly reduced.

The use of a low-cost light source formed from the red LED can also reduce the cost of the photosensor system.

(3) Third Embodiment

Figure 12:
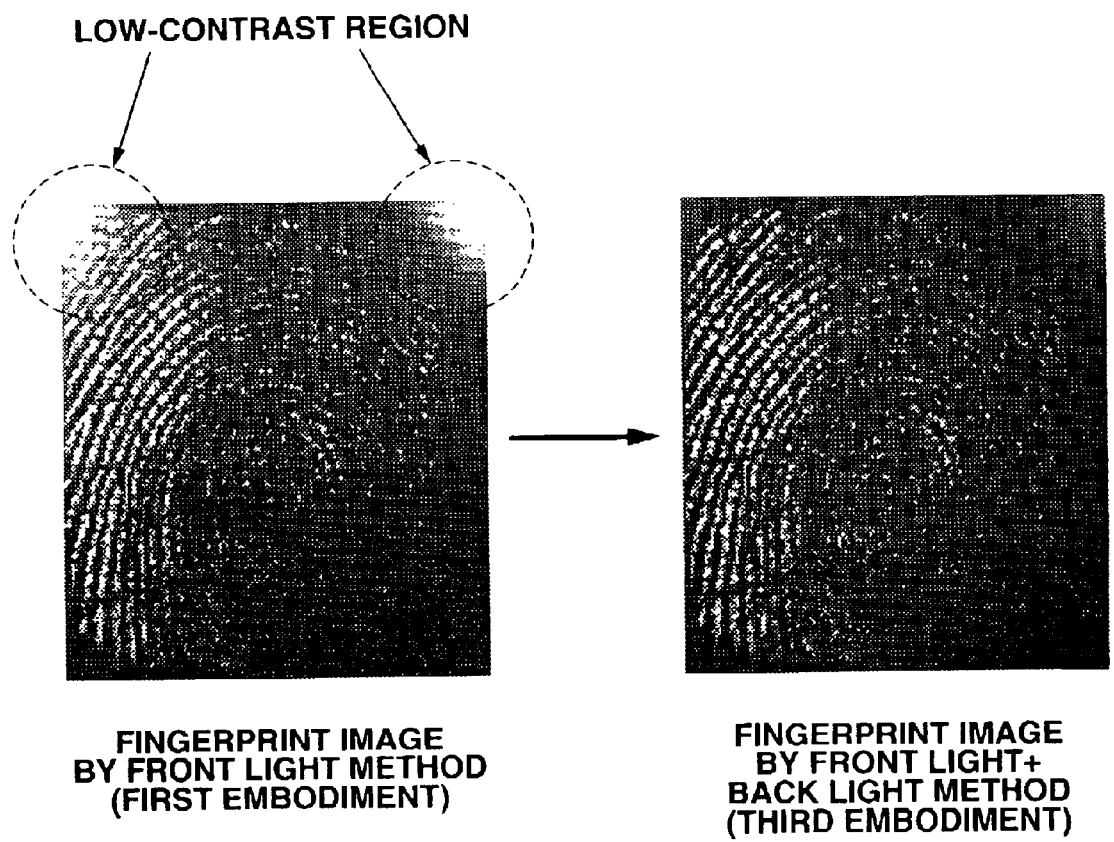
FIGS. 12A and 12B are views showing a fingerprint image read by the method of the first embodiment using only a front light, and a fingerprint image read by the method of the third embodiment using both front and back lights.
Figure 13:
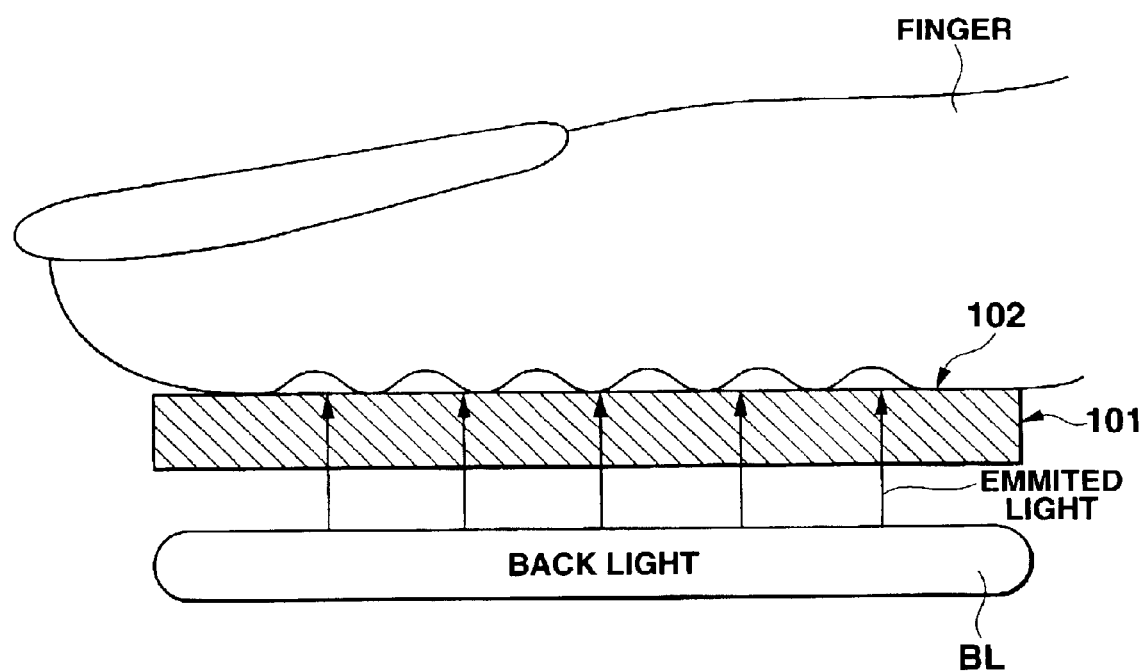
FIG. 13 is a sectional view showing the schematic structure of a fingerprint reading portion in a photosensor system using a back light.

When a fingerprint image is read using the above-described front light, it is difficult for the finger to contact a light-receiving surface 102 near the periphery of the finger, and external light readily enters the light-receiving surface 102. This is because the surface of the finger is curved and the section of the finger in the direction of length is almost semicircular. The read fingerprint image becomes bright (whitish) and the contrast readily becomes nonuniform particularly at the periphery of the finger. An example of the nonuniform fingerprint image is shown in FIG. 12A. Low-contrast regions are formed on two sides at the upper portion of the fingerprint image.

The third embodiment solves the drawback in the use of the front light. This embodiment adopts both front and back lights by combining the front light method according to the first embodiment and the conventional back light method in order to obtain a uniform-contrast fingerprint image.

Figure 10:
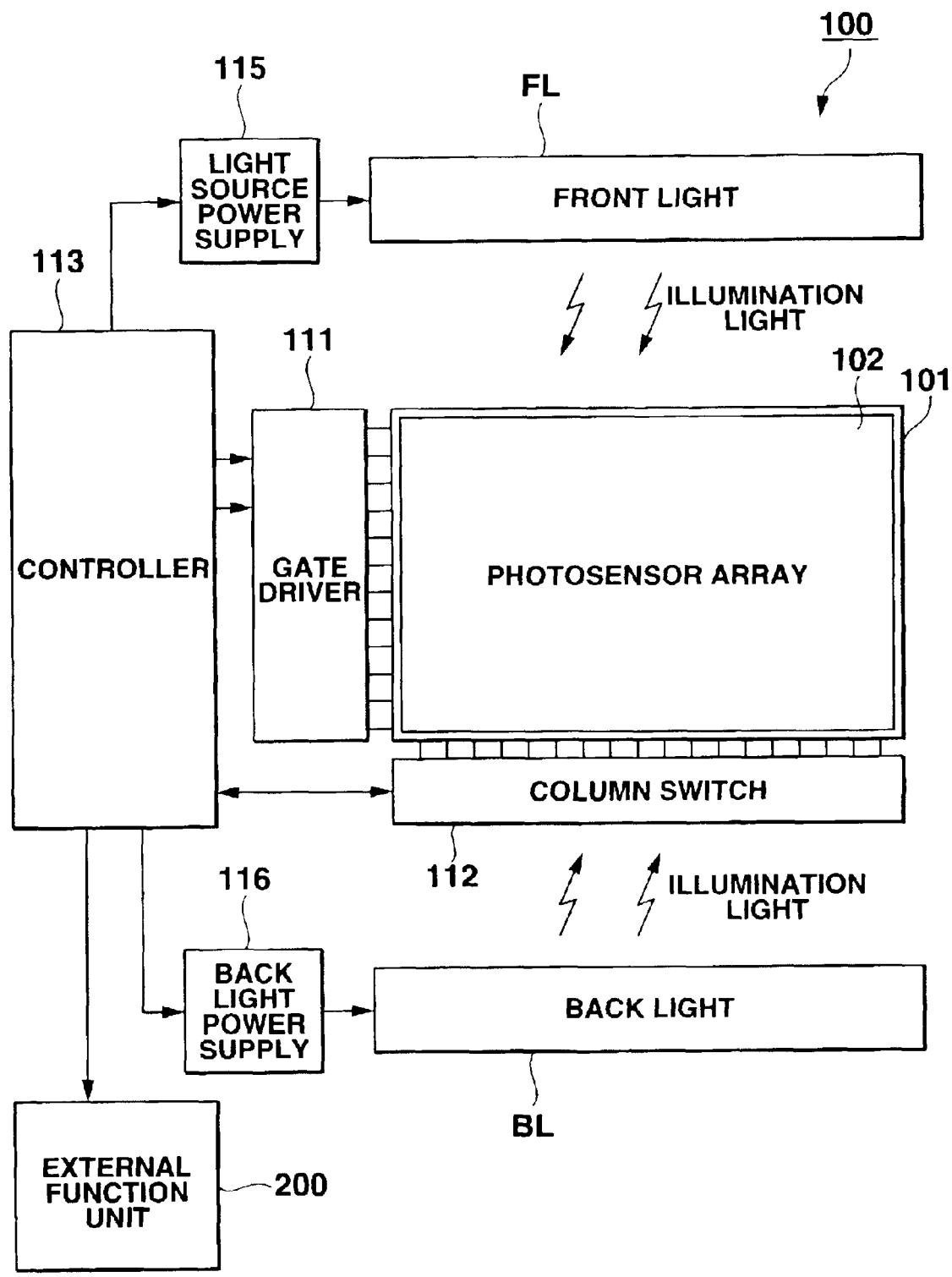
FIG. 10 is a block diagram showing an arrangement of a photosensor system according to the third embodiment of the present invention.

FIG. 10 is a block diagram showing an arrangement of a photosensor system according to the third embodiment of the present invention. This photosensor system comprises a back light power supply 116, and a second light source (back light) BL arranged on the back surface of a photosensor array 101 opposite to the light-receiving surface 102, in addition to the arrangement of the photosensor system according to the first embodiment.

Figure 11:
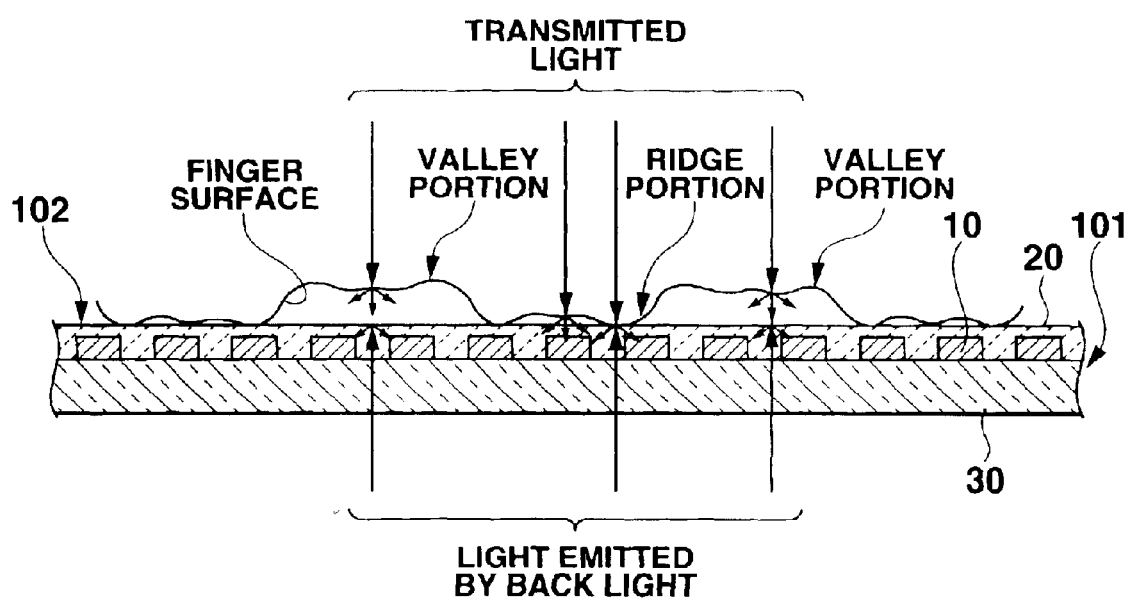
FIG. 11 is an enlarged sectional view showing the main part at the fingerprint reading portion of the photosensor system according to the third embodiment.

FIG. 11 is an enlarged sectional view showing the main part at the fingerprint reading portion of the photosensor system according to the third embodiment. In FIGS. 10 and 11, the same reference numerals as in the prior art shown in FIG. 14B denote the same parts.

The third embodiment using both front and back lights FL and BL can use the light source to compensate for contrast nonuniformity generated in the use of only the front light FL. This embodiment may obtain a uniform-contrast fingerprint image.

FIGS. 12A and 12B show a comparison between a fingerprint image read by the method of the first embodiment using only the front light FL, and a fingerprint image read by the method of the third embodiment using both the front and back lights FL and BL. In the fingerprint image shown in FIG. 12A obtained by using only the front light FL, the lightness increases on two sides at the upper portion of the fingerprint image, generating low-contrast regions. However, the fingerprint image in FIG. 12B according to the third embodiment is free from such a low-contrast region, and a uniform-contrast fingerprint image is attained.

In the third embodiment, the image reading sensitivity of a photosensor 10 can be adjusted similarly to setting of an optimal image reading sensitivity in the first embodiment described above.

In the first embodiment, the image reading sensitivity of the photosensor 10 may be kept constant, and the illuminance of the front light FL may be controlled by the light source power supply 115 so as to obtain an optimal fingerprint image. In the third embodiment, the illuminance of the back light BL may also be controlled by the back light power supply 116 to obtain an optimal fingerprint image.

Similar to the first and second embodiments, when the front light FL is a white light source, the third embodiment can employ, e.g., a halogen lamp which provides an illuminance of 1,000 lux on the light-receiving surface 102 bearing no finger. When the front light FL is a red light source, the third embodiment can employ, e.g., a red LED which provides an illuminance of 100 lux on the light-receiving surface 102 bearing no finger.

The light source BL (back light) can be a light source having an emission luminance of 100 nit ($cd/m^2$) or more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed:

1. A photosensor system comprising:
   a photosensor array which is constituted by two-dimensionally arraying a plurality of photosensors and which has a light receiving surface;
   a first light source which is arranged to face the light receiving surface at an interval, and which illuminates a rear surface of an object whose front surface is set on the light receiving surface;
   an image reading assembly which reads corrugations on the front surface of the object as an object image by receiving light that is emitted by said first light source, which passes through the object, and is scattered according to the corrugations on the front surface of the object; and
   a second light source which is arranged on a side of said photosensor array opposite to the light receiving surface, and illuminates via said photosensor array the front surface of the object set on the light receiving surface,
   wherein said image reading assembly receives light that is emitted by said second light source and reflected by the front surface of the object set on the light receiving surface, and reads the object image together with light that is emitted by said first light source and passes through the object.

2. A system according to claim 1, wherein
   the object includes a human finger, and
   the object image includes a fingerprint image.

3. A system according to claim 1, wherein said first light source emits white light, and provides an illuminance of at least 1000 lux on the light receiving surface.

4. A system according to claim 1, wherein said first light source emits red light, and provides an illuminance of at least 100 lux on the light receiving surface.

5. A system according to claim 1, further comprising a housing which covers at least said photosensor array and said first light source, the housing having an opening to which the object is inserted, and a light shielding characteristic.

6. A system according to claim 1, wherein said second light source has an emission luminance of at least 100 nit.

7. A system according to claim 1, wherein said image reading assembly comprises luminance adjustment means for variably controlling an emission luminance of said second light source to a value suitable for reading of an optimal object image.

8. A system according to claim 1, wherein said image reading assembly comprises:
   sensitivity adjustment reading means for reading the object image at a plurality of image reading sensitivities, optimal image reading sensitivity deriving means for deriving an optimal image reading sensitivity suitable for the reading operation of the object image on the basis of object images read by said sensitivity adjustment reading means at the image reading sensitivities, and image reading sensitivity setting means for setting the optimal image reading sensitivity as an image reading sensitivity.

9. A system according to claim 8, wherein the reading operation of the object image by said sensitivity adjustment reading means is executed by setting different image reading sensitivities stepwise with respect to photosensors every predetermined number of rows of said photosensor array.

10. A system according to claim 8, wherein the reading operation of the object image by said sensitivity adjustment reading means is executed by setting different image reading sensitivities stepwise with respect to photosensors on specific rows of said photosensor array.

11. A system according to claim 8, wherein the reading operation of the object image by said sensitivity adjustment reading means is executed in one of an entire region of the light receiving surface of said photosensor array and a detection region set in advance within the light receiving surface.

12. A system according to claim 8, wherein the image reading sensitivity is set by adjusting a charge accumulation period in the photosensor.

13. A system according to claim 1, wherein said image reading means comprises illuminance adjustment means for variably controlling an illuminance of light emitted by said first light source to a value suitable for reading an optimal object image.

14. A system according to claim 1, wherein the photosensor comprises source and drain electrodes formed via a channel region formed from a semiconductor layer, and top and bottom gate electrodes formed at least above and below the channel region via insulating films, and the photosensor has an arrangement in which the top gate electrode is used as a first gate electrode, the bottom electrode is used as a second gate electrode, either one of the first and second gate electrodes is used as a light irradiation side, and charges corresponding to a quantity of light irradiated from the light irradiation side are generated and accumulated in the channel region.

15. An image reading method in a photosensor system which reads an object image by a photosensor system having a photosensor array constituted by two-dimensionally arraying a plurality of photosensors, comprising:

setting a front surface of an object on a light receiving surface of the photosensor array;

performing first illumination of illuminating the object set on the light receiving surface from a rear surface of the object;

reading corrugations of the front surface of the object as an object image by receiving light which irradiates the rear surface of the object in the first illumination, passes through the object, and is scattered according to the corrugations on the front surface of the object; and performing a second illumination of illuminating the object set a the light receiving surface from the front surface of the object via the photosensor array, wherein light which irradiates the front surface of the object in the second illumination and is reflected by the front surface of the object is received to reed the object image together with light having passed through the object in the first illumination.

16. A method according to claim 15, wherein the object includes a human finger, and the object image includes a fingerprint image.

17. A method according to claim 15, wherein the image reading comprises setting an emission luminance of a light source in the second illumination to a value suitable for reading of an optimal object image.

18. A method according to claim 15, wherein the image reading comprises reading a sensitivity adjustment object image by changing an image reading sensitivity in a plurality of steps, deriving an image reading sensitivity suitable for the reading operation of the object image on the basis of object images read at the image reading sensitivities in reading of the sensitivity adjustment object image, and setting the derived image reading sensitivity as a reading sensitivity in the reading operation of the object image.

19. A method according to claim 15, wherein the image reading comprises setting an illuminance of light which illuminates the back surface of the object in the first illumination to a value suitable for reading of an optimal object image.

* * * * *